(12) United States Patent
Iglesias Rodriguez et al.

(10) Patent No.: US 8,471,397 B2
(45) Date of Patent: Jun. 25, 2013

(54) FLOATING DEVICE FOR HARNESSING SWELL ENERGY BY LATERAL OVERFLOW

(75) Inventors: Jose Gregorio Iglesias Rodriguez, Santiago de Compostela (ES); Rodrigo Carballo Sanchez, Santiago de Compostela (ES); Alberte Castro Ponte, Santiago de Compostela (ES)

(73) Assignee: Universidade de Santiago de Compostela, Santiago de Compostela (ES)

( * ) Notice: Subject to any disclaimer, the term of this patent is extended or adjusted under 35 U.S.C. 154(b) by 581 days.

(21) Appl. No.: 12/303,917

(22) PCT Filed: Jun. 5, 2007

(86) PCT No.: PCT/ES2007/070110
§ 371 (c)(1),
(2), (4) Date: Sep. 10, 2010

(87) PCT Pub. No.: WO2007/141363
PCT Pub. Date: Dec. 13, 2007

(65) Prior Publication Data
US 2011/0057447 A1    Mar. 10, 2011

(30) Foreign Application Priority Data
Jun. 7, 2006  (ES) .................... 200601581

(51) Int. Cl.
*F03B 13/10*     (2006.01)

(52) U.S. Cl.
USPC ............................. 290/53; 290/42

(58) Field of Classification Search
USPC ......................... 290/42, 43, 53, 54
See application file for complete search history.

(56) References Cited

U.S. PATENT DOCUMENTS 4,118,932 A * 10/1978 Sivill ............................ 60/500
4,389,843 A *  6/1983 Lamberti ....................... 60/507
(Continued)

FOREIGN PATENT DOCUMENTS

DE      3803570     7/1988
DE      3922724     1/1991
(Continued)

OTHER PUBLICATIONS

International Search Report, dated Sep. 24, 2007, issued in International Application No. PCT/ES2007/070110.

*Primary Examiner* — Nicholas Ponomarenko
(74) *Attorney, Agent, or Firm* — Knobbe Martens Olson & Bear LLP

(57) ABSTRACT

Floating device for harnessing swell energy by lateral overflow, said device being formed by hulls which converge in plan view and have a variable freeboard between which the waves propagate. The convergence produces a gradual increase in the height of the wave as it propagates between the hulls, which, together with the reduction in the freeboard from a particular section of said hulls, gives rise to the lateral overflow of the mass of water of the crest over their rails, which is collected in tanks which are at different heights (in accordance with the reduction in the freeboard) and are connected to the corresponding turbines. The angle of convergence between the hulls can be varied in order to be adapted to the sea state. The harnessing system is supplemented with a connecting closure ramp between the sterns of the hulls in order to collect the water which has previously not managed to overflow the structure.

5 Claims, 6 Drawing Sheets

U.S. PATENT DOCUMENTS

| | | | |
|---|---|---|---|
| 4,392,349 A * | 7/1983 | Hagen | 60/500 |
| 4,480,966 A * | 11/1984 | Smith | 417/332 |
| 5,132,550 A * | 7/1992 | McCabe | 290/53 |
| 6,476,511 B1 * | 11/2002 | Yemm et al. | 290/42 |
| 7,315,092 B2 * | 1/2008 | Cook | 290/53 |
| 7,443,047 B2 * | 10/2008 | Ottersen | 290/53 |
| 7,525,207 B2 * | 4/2009 | Clidaras et al. | 290/43 |
| 7,808,120 B2 * | 10/2010 | Smith | 290/42 |
| 8,358,025 B2 * | 1/2013 | Hogmoe | 290/53 |

FOREIGN PATENT DOCUMENTS

| | | |
|---|---|---|
| DE | 19726504 | 1/1999 |
| EP | 0767876 B1 | 2/2001 |
| GB | 612175 | 11/1948 |
| JP | 61070174 | 4/1986 |
| WO | WO00/71892 | 11/2000 |
| WO | WO02/44557 | 6/2002 |

* cited by examiner 7   7

16

FLOATING DEVICE FOR HARNESSING SWELL ENERGY BY LATERAL OVERFLOW

RELATED APPLICATIONS

This application is a U.S. National Phase of International Application No. PCT/ES2007/070110, filed Jun. 5, 2007, designating the U.S. and published on Dec. 13, 2007 as WO 2007/141363, which claims priority to Spanish Patent Application No. P200601581, filed Jun. 7, 2006. The content of these applications is incorporated herein by reference in its entirety.

The present invention consists of a floating structure formed by hulls which converge in plan view and have a variable freeboard between which the waves propagate. The convergence of the lateral contours produces a gradual increase in the height of the wave. This fact, together with the reduction in the freeboard of the hulls from a certain point, gives rise to the lateral overflow of the mass of water of the crest of the wave, which is collected in tanks situated at different heights (in accordance with the reduction in the freeboard) and are connected to the corresponding turbines.

STATE OF THE ART

In recent years a variety of energy generation devices from swells have been revealed. One class of these devices is formed by the so-called 'overtopping' devices, which are characterized in that they take advantage of the wave swell, with various configurations existing in order to achieve the increase of said height.

The first system of this type is that known as TAPCHAN (1985). It was built in rock and basically consisted of a converging channel, so that it was able to concentrate the wave, finally pouring the water into a reservoir to move a turbine. But the production of this system was limited for various reasons, amongst which was the necessity of a small tidal range.

Another series of floating devices was designed from this coastal system, occasionally called 'floating Tapchans' in the generic form, and are based on the same principle of taking advantage of the wave swell to move a turbine, essentially differentiating itself in the way of achieving said height and of conducting the water towards the tanks.

Most of these devices try to achieve a greater height by means of a ramp, so that part of the kinetic energy of the wave is transformed into potential energy, thereby achieving that the wave overflows the crown of the ramp. This design is affected, on the one hand, by the limitations in height of the wave produced, and on the other, by using water at a single level. As a consequence, the volume of water gathered and the energy efficiency are reduced.

Subsequent designs have partly tried to resolve these problems with different modifications. In order to increase the height of the wave, there are devices which use either converging walls, which at times are situated on the ramp itself, such as in patents DE19726504 and GB612175, or converging arms (original idea of TAPCHAN) which draw the wave towards it. With regard to the problem stemming from working with a single level of storage, there are devices which use different level tanks in which the mass of water is poured through openings disposed at different heights of the ramp, such as in WO0071892. The water enters the tanks as the liquid flow ascends the ramp or as it returns, depending on the arrangement of the openings.

In spite of the improvements made in current devices, these continue to suffer in large part from said limitations, in addition to other fundamental limitations linked to its performance in real swell conditions.

The main performance problem in these devices is caused by the use of the ramp as single form of collecting the wave. This method of collection requires a design in which the ramp is arranged in parallel to the front of the wave in order to thereby maximize the energy harnessed, which makes the structure have a short length with regard to its jetty. In energy swell situations this configuration entails the device making large movements, particularly lifting and pitching, which substantially reduce its energetic efficiency.

Other limiting factors stemming from this design are those associated with the unlikely survival in extreme swell conditions to which the devices will be submitted, given that they will probably be located in areas with very energetic oceanic climates.

Finally, it is necessary to refer to the high manufacturing costs as it uses said ramps, bearing in mind that the front of the wave will simultaneously actuate on the entire span of the ramp and that with wave heights greater than those which a sea wall must resist, due to the greater depth at which the energy harnessing device will be situated.

DESCRIPTION OF THE INVENTION

The object of the present invention is to propose a harnessing system by lateral overflow at different heights in order to resolve the drawbacks explained previously, common to the 'overtopping' swell energy harnessing devices.

The system of the invention consists of a floating device formed by hulls between which the waves propagate. The separation between the hulls is not constant, as it is reduced forward and aft, in the direction of propagation of the wave. This convergence in plan view entails an increase of the height of the crest. When this exceeds the freeboard (vertical distance between the floating line and the rail) of the interior side of the hulls, it begins to produce the lateral overflow, in the noticeably perpendicular direction to the direction of propagation. The loss of mass of water due to this lateral overflow entails a reduction of wave height of the crest which would bring the overflow to an end, if not for the gradual drop of the freeboard, in the direction of propagation of the wave, from a certain point of the extension of the hull, close to mid-length. Additionally, the convergence of the hulls contributes to the upkeep of the lateral overflow.

Said lateral overflow is produced on the interior side of the hulls which have a preferably straight profile, while the profile of the exterior sides shall be curved.

The mass of water that overflows the rails is collected in tanks situated in the hulls in the area whereon said overflow is produced, at different levels, in accordance with the freeboard of the span of the hull wherein each tank collects the overflow. The overflow area covers from the tip of the length wherein the freeboard begins to descend to the stern. The tanks can be extended longitudinally towards the bow, if necessary, intended to maximize the volume of water collected.

Each one of these tanks pours, though a propulsion duct, into a turbine whose working height is adapted to the level of the corresponding tank. All of this achieves a greater volume of water collected, disposed gradually, in addition to a better performance in the turbines themselves as they have a narrower working height range, corresponding to the variation in the height of water stored in the deposit which propels.

This design also permits working efficiently with a large variety of wave patterns, given that if the energetic availability in a certain sea state is not very high, the lateral overflow will not begin at the point wherein the freeboard of the interior side of the hulls begins to descend. This will be produced at a later point, where the height of the crest exceeds the freeboard of the interior contours, so that it can be used.

In spite of this greater adaptability to the oceanic climate, in terms of volume of water collected, there will always be a part of the wave that does not manage to overflow the structure.

With the aim of collecting this part of the wave, the hulls are joined to each other at their tailwater (abaft) end, wherein its proximity is greater due to effect of the convergence, by means of a closure ramp. This preferably is disposed obliquely to the front of the wave, with straight or curved profiles and symmetry with respect to a vertical plane by the longitudinal axis of the device. Therefore, a part of the mass of water of the crest that has not been previously collected is forced to overflow this closure ramp laterally and frontally and is collected in the stern tank or tanks (at a lower level) of the lateral hulls.

In any case, and unlike other devices, this closure ramp is devised as a complementary element, so it is submitted to less structural requirements than those devices wherein it constitutes the main water collecting system.

The collecting stern tanks, which collect the water at a lower level, can be situated one in each hull, independently, in the case whereof a frontal deflector will be disposed which directs the water that comes up and overflows the ramp in its central area towards them. In the event that it only has a single tank which covers the entire stern, said deflector will be done without.

The disclosed system is based on a collection of water distributed over time (as the wave advances) and space (along the hulls), in contrast to the existing overflow devices, wherein the collection of the mass of water takes place at a specific time and place.

In order to achieve this gradual collection of the mass of water of the crest, the collecting system faces noticeably parallel to the direction of propagation of the wave, which features structural windows—as mentioned—compared to other devices wherein they face perpendicularly to said direction. This also entails the necessity of a geometry of greater extension (length) than in said systems, so that the present device will have a length/jetty ratio in the order of catamaran type crafts.

On the other hand, this extension is necessary for the convergence of the hulls to be effective in increasing the height of the wave. In any case, the geometry of long length benefits a reduction of the movements under the action of the swells, especially pitching and lifting, which in other systems notably lowers the energetic efficiency.

In order to enhance the efficiency of the system, it is permitted to regulate the convergence in plan view of the hulls, i.e., the variation of the separation between each other at their most distal end (bow), depending on the sea state, by means of hinges, cables or other type of mechanism.

In accordance with one of the objectives of durability, it has a closure ramp between mobile hulls, so that it can be withdrawn in stormy conditions, and can be folded up by means of hinges or other mechanism, preferably towards the inside of the hulls. Together with a non-convergent regulation of the hulls (parallel hulls), this will permit the circulation and outlet of the wave through the space between them in stormy conditions, as there is no obstacle, without producing an increase of its initial height.

In order to prevent interruptions in the supply of the turbines due to movements of the device under the action of swells, the tanks will have a descending support towards noticeably conical devices, located on its lower side. They will be placed in the upper part of the ducts wherethrough the mass of water is directed to the turbine, connecting the collection tanks and said ducts. In this way, they will actuate as a "buffer", ensuring the continuous operation of the turbines.

The device also has a series of ballast tanks in the bow area, whose content of water can be varied, and therefore the inclination and freeboard of the device depending on the sea state.

The anchor will preferably be at a single point, so that the device turns on its moorings in order to remain facing the direction of impact of the swells.

In the event that the device was formed by three hulls, the water would be collected thereon by overflow by the same principle previously explained. In this case, the mass of water of the crest of the wave would overflow over the interior side of the exterior hulls, while the overflow over the central hull would be produced over both sides, as the two are interior.

The objective of the invention, with everything disclosed above, is the collection of the maximum volume of water possible, mainly by lateral overflow of the crest of the wave, subsequently complemented by climbing and overflow thereof onto a closure ramp. It will work with different collection levels, thus optimizing both the height whereat the water is stored and the efficiency in the turbines themselves. The configuration of the structure will allow the reduction of the pitching and lifting movements under the action of the swells, with the consequent benefits for the regular collection of water in the tanks. Likewise, said configuration ensures the survival of the structure in stormy conditions.

PREFERRED EMBODIMENT OF THE INVENTION

Figure 1:
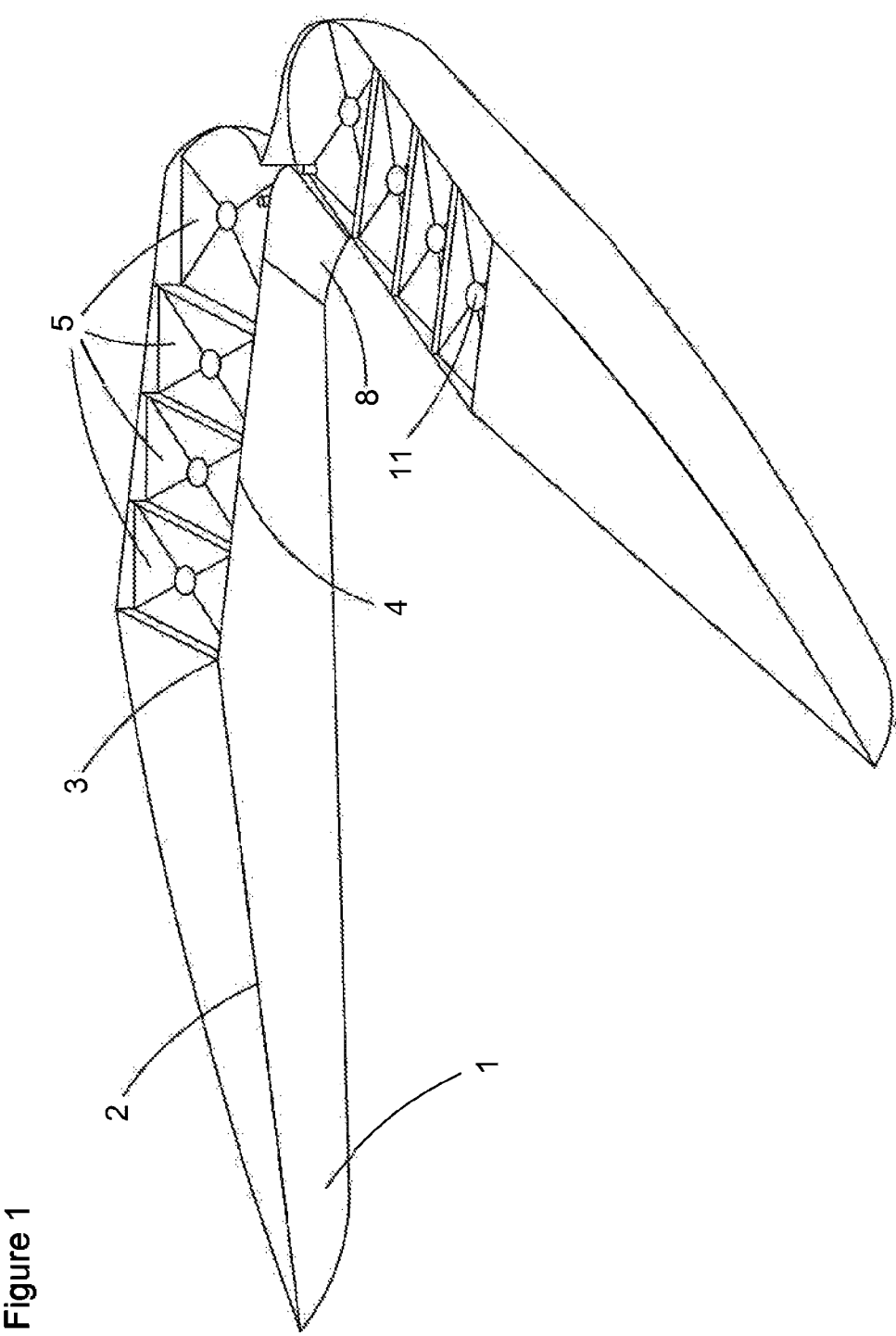
FIG. 1 represents a perspective view of the assembly of the system of invention, formed by 2 converging hulls (1), which have a first span with ascending freeboard (2) and a second span, from a certain point (3) of its length, of descending freeboard (4). The lateral overflow is produced on this second span. At the stern end is situated the closure ramp (8) connecting both hulls. The collection tanks (5) situated in the overflow area, the noticeably conical devices (11) which connect the tanks and the turbine connecting ducts can also be observed.
Figure 3:
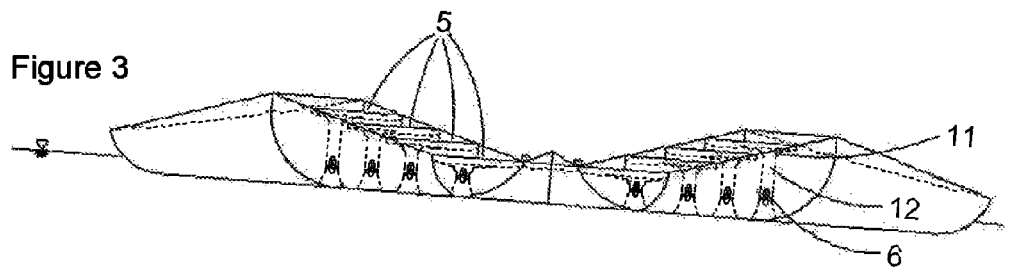
FIG. 3 represents a rear elevational view, viewed from stern, wherein the arrangement of the tanks (5) situated on the hulls in the overflow area at different levels are shown, in accordance with the freeboard of the hull span wherein each tank collects the overflow; the noticeably conical device (11) as a "buffer"; and the connection to the corresponding turbines (6) by means of a propulsion tank (12)
Figure 2:
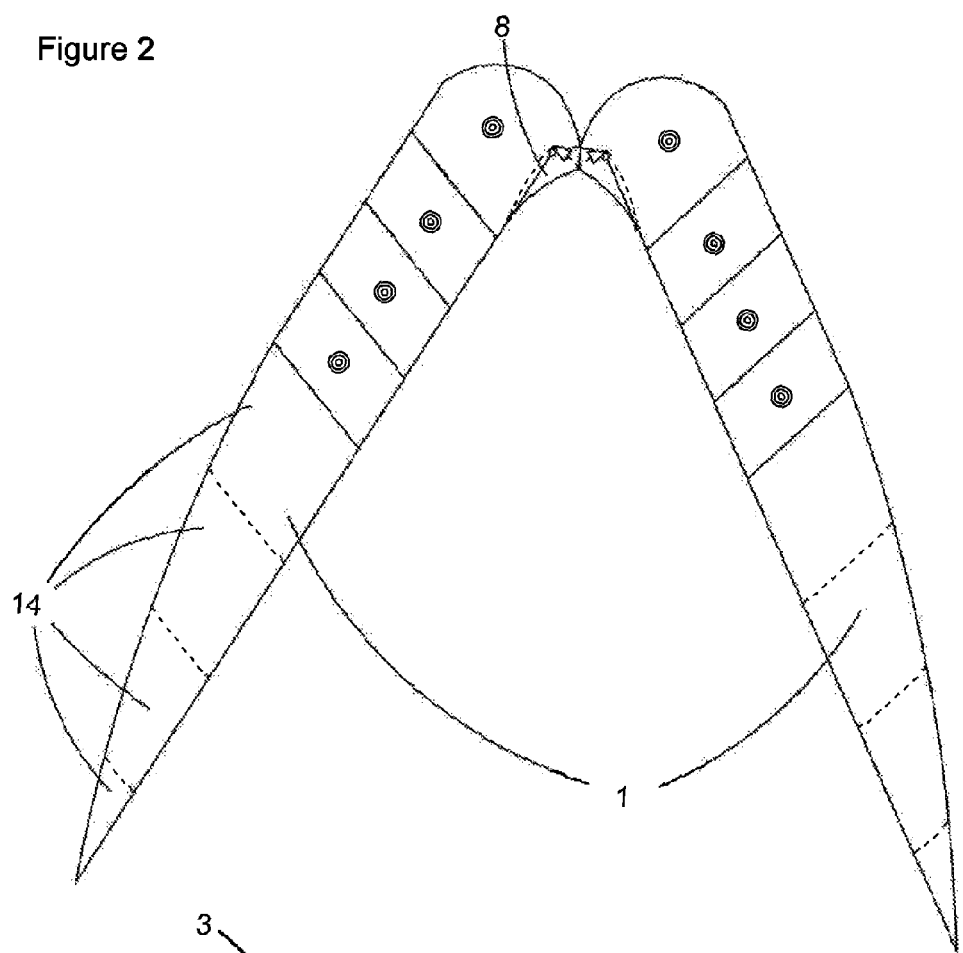
FIG. 2 represents an upper plan view of the device, wherein the convergence of the hulls (1) in fore-and-aft direction are shown; the final closure ramp (8) between both hulls and the ballast tanks (14) situated at the bow.
Figure 4:
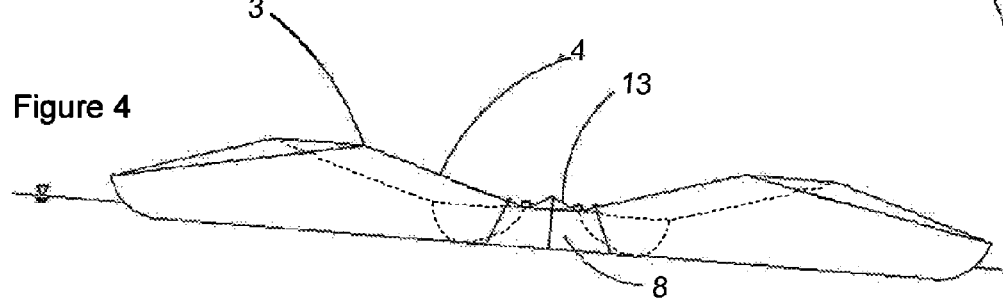
FIG. 4 is a frontal view, observed from stern, wherein the contour of the hulls is observed, wherein from a certain point (3) of its extension (length) the freeboard descends (4), giving rise to the lateral overflow. The final closure ramp (8) can also be observed connecting both hulls situated to stern, whereon the frontal deflector (13) is situated to direct the water towards the stern collection tanks.
Figure 6:
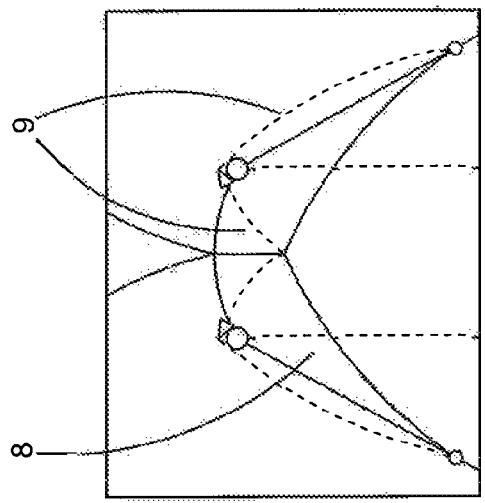
FIG. 6 is a close-up view of FIG. 5 relating to the way of folding up (9) the final closure ramp (8) towards the inside of the hulls. This folding permits, together with a non-convergent regulation of the hulls, the propagation of the front of the unaltered wave along the device.
Figure 5:
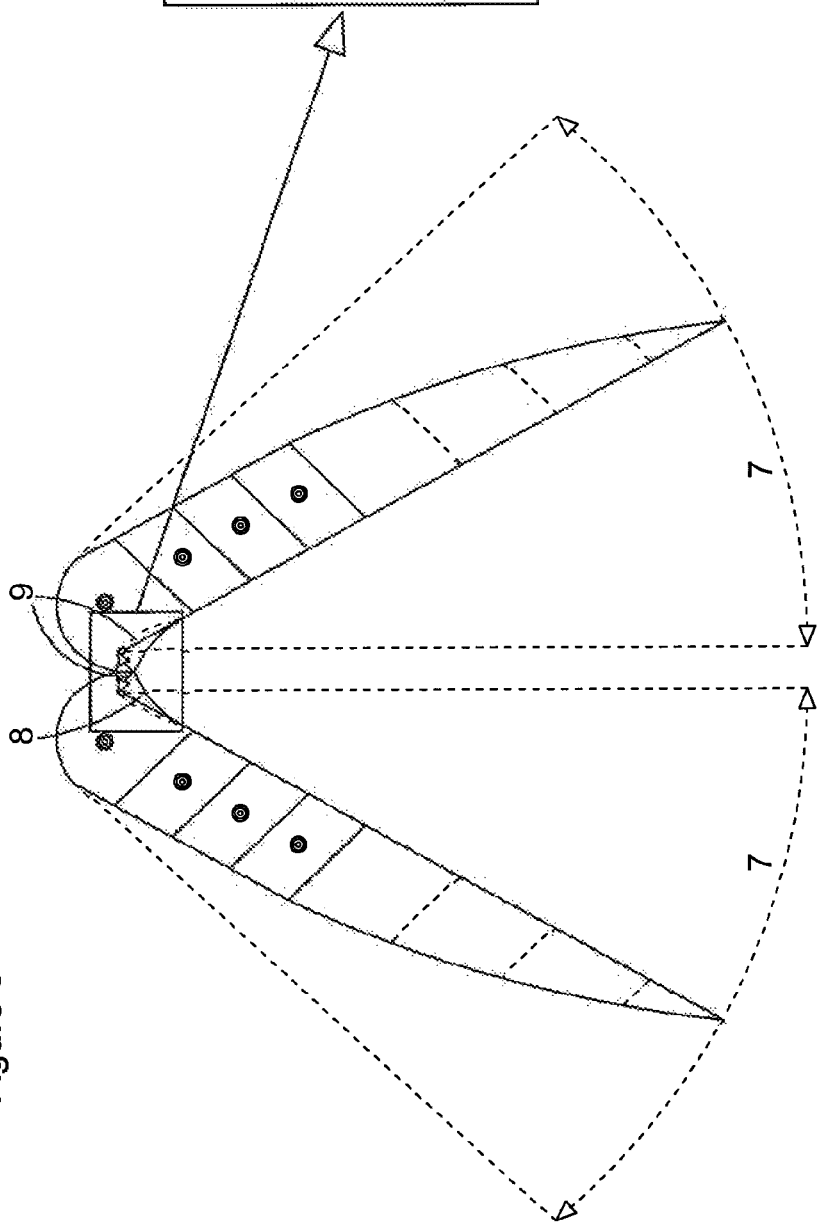
FIG. 5 is a plan view, wherein the regulation of the convergence of the hulls (7) depending on the sea state, until non-convergence situation (parallel hulls) is observed. It also shows the final closure ramp (8) and its way of folding up (9)
Figure 7:
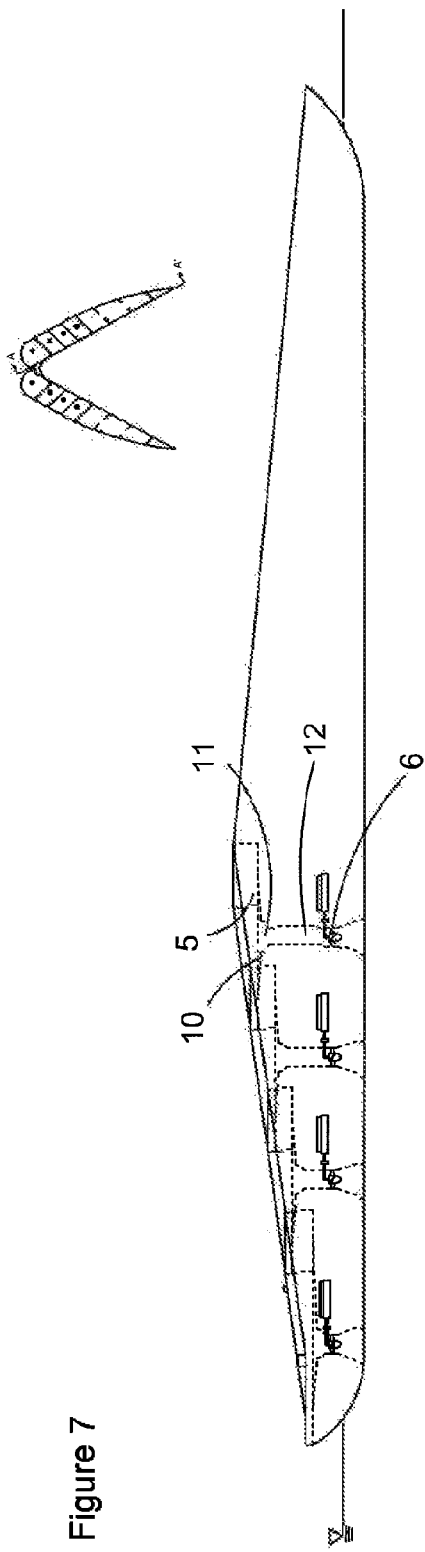
FIG. 7 represents an A-A' cross-section of a hull, wherein the manner of collecting in tanks (5) at different levels can be observed; the slope of the support (10) of said tanks, descending towards a noticeably conical device (11) which connects it with the propulsion duct (12) of the turbine (6)
Figure 9:
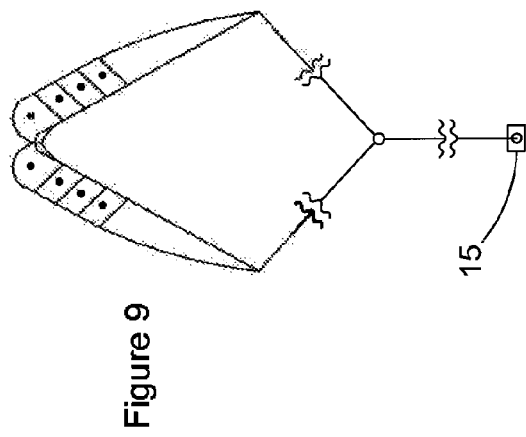
FIGS. 8 & 9 are a longitudinal profile and an upper plan view of the anchoring point for a single point (15).
Figure 8:
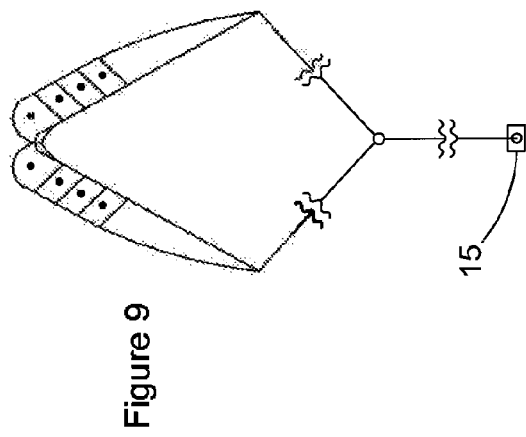
Figure 10:
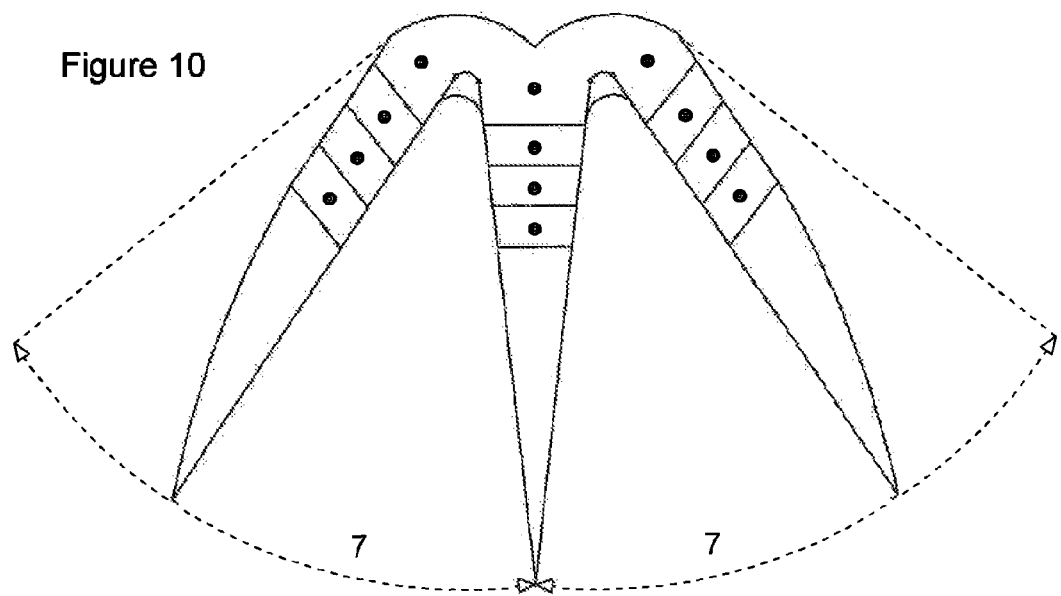
FIG. 10 is a plan view of a device formed by 3 hulls, wherein the mass of the crest of the wave overflows the interior side of the exterior hulls and both sides of the central hull. The regulation of the convergence of the hulls (7) depending on the sea state can also be observed.
Figure 11:
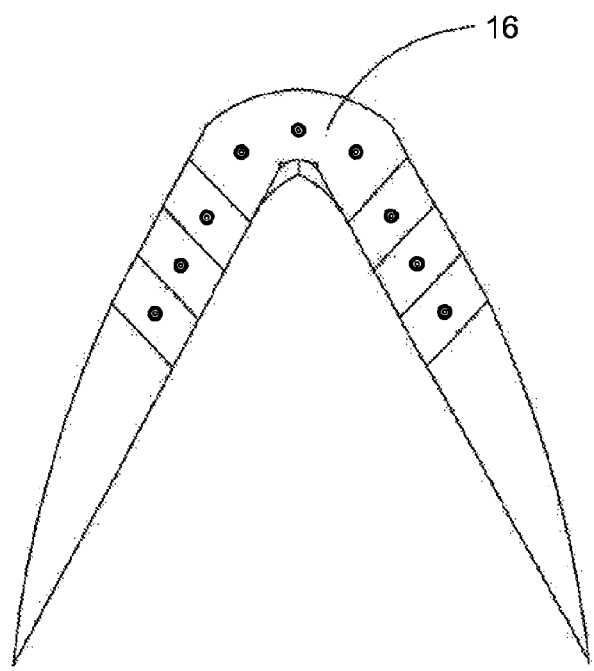
FIG. 11 is a plan view of a device, with a single stern collection tank (16), in the case whereof the frontal deflector is done without.
Figure 12:
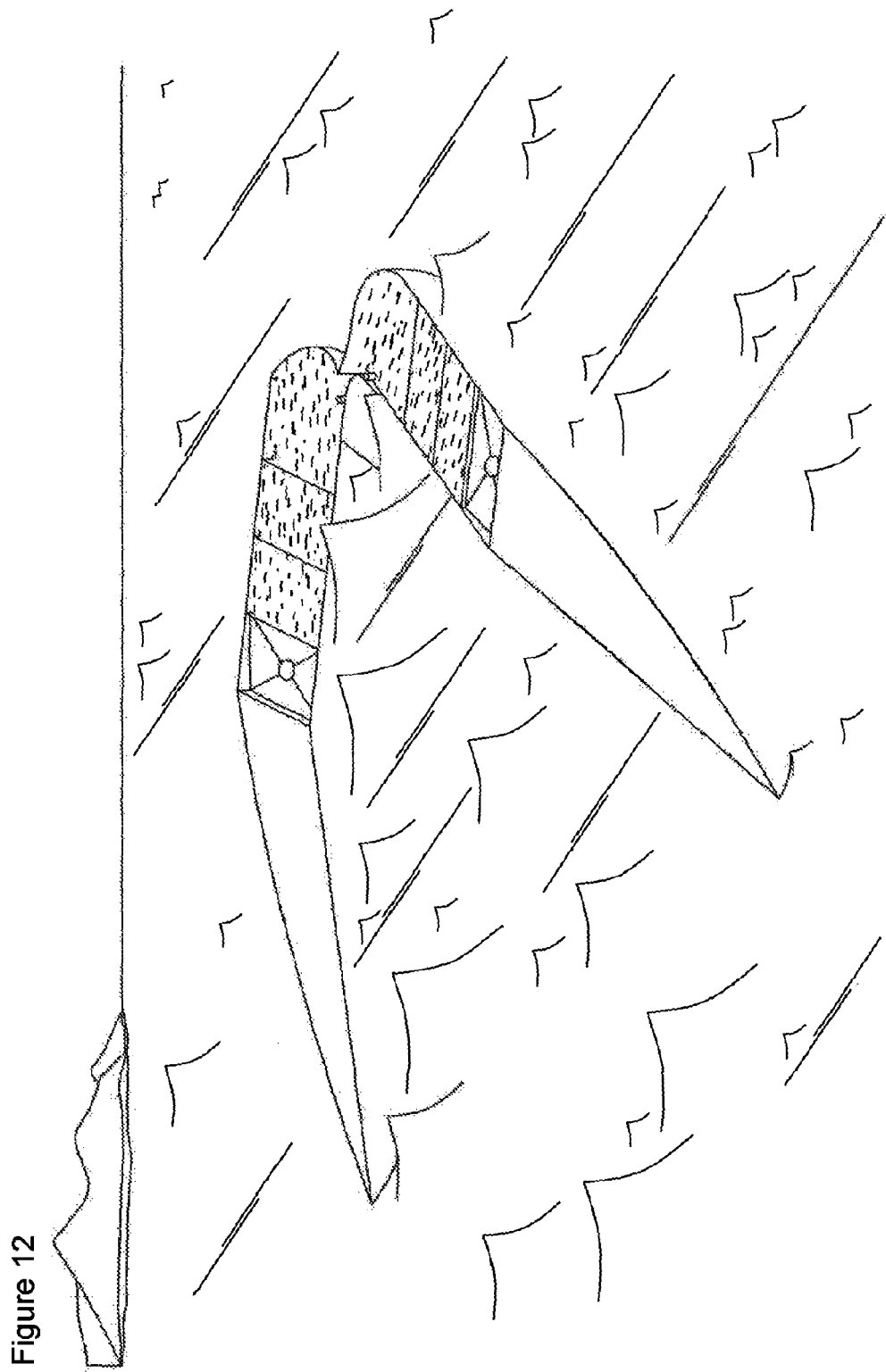
FIG. 12 is a view of the device in working conditions.

A preferred embodiment of the invention would be constituted by two hulls (1) which converge in plan view, with a length/jetty ratio between 5 and 7; exterior side of the hulls of curved profile and interior straight, with ascending freeboard (2) in a first increasing wave height span and a second span, from a certain point (3) close to the mid-length, of gradually descending freeboard (4) permitting the lateral overflow. The convergence (7) of the hulls can be regulated by means of hinges situated in the stern area, depending on the sea state and until a non-convergence configuration (parallel hulls).

In the descending part of said hulls is disposed a series of collection tanks (5) situated at different heights and each one connected to turbines (6) through the corresponding propulsion ducts (12).

It will have a closure ramp (8) connecting both hulls at their tailwater (abaft) end, disposed obliquely to the front of the wave, with curved profiles, and symmetrical with respect to a vertical plane by the longitudinal axis of the device, which will permit the climbing and overflow of part of the water, which had previously not managed to laterally overflow the rails of the hulls, towards the stern tanks. It will have a frontal deflector (13) to direct the water which climbs the ramp in its central area towards said stern tanks.

The final closure ramp will be foldable (9) towards the inside of the hulls by means of hinges, which in stormy conditions will permit the free propagation of the wave, without any obstacle between the hulls.

The lateral collection tanks have a descending support (10), with angle in the longitudinal direction of the same order as that of pitching design, and in transversal direction of the same order as that of balance design. Therefore, the water will be directed towards the propulsion duct (12) of the turbines, which have in their upper part a noticeably conical device (11), which connects to the tanks, and acts as a "buffer".

There will be a series of ballast tanks (14) in the bow of the structure intended to control the inclination and the freeboard of the device, varying the volume of water contained therein.

The system turns about its mooring at a single anchoring point (15), so that it faces the direction of impact of the swells on its own.

The characteristics of a preferred embodiment having been described, it must be indicated that in no case will the device be limited to the exact details of that previously described, rather any modifications deemed appropriate can be made without altering the essential characteristics of the invention in any case, and which are claimed below.

The invention claimed is:

1. A floating device for harnessing swell energy by lateral overflow which comprises
   a structure formed by hulls which converge in plan view in fore-and-aft direction, of variable freeboard, descending from a certain point close to mid-length, producing the lateral overflow about said hulls by the mass of water of the crest of the wave noticeably perpendicular to its interior sides;
   collection tanks, situated on the hulls in the overflow area at different levels in accordance with the freeboard of the span of hull wherein each tank collects the overflow, each connected to the corresponding turbines by means of propulsion ducts;
   a closure ramp which connects the hulls at their tailwater end (abaft);
   a frontal deflector situated on the closure ramp at its midpoint;
   a ballast tanks located in the bow area of the hulls; and
   an anchoring system at a single point.

2. The overflow device according to claim 1, said device formed preferably by 2, and alternatively 3 hulls, with converging arrangement in plan view which can be regulated by means of hinges, cables or other mechanism; with variable freeboard, gradually decreasing the height of the rails from a certain point of its length; with exterior sides of curved profile and interior preferably straight.

3. The overflow device according to claim 1, wherein said collection tanks situated in the lateral overflow area comprise a descending support towards a noticeably conical device which connects the tank and the turbine propulsion duct.

4. The overflow device according to claim 1, wherein said closure ramp is preferably disposed obliquely to the front of the wave, with straight or curved profiles, symmetrical with respect to a vertical plane by the longitudinal axis of the device and foldable by means of hinges or other mechanism towards the inside of the hulls, whereon the lateral and frontal overflow is produced.

5. The overflow device according to claim 1, wherein said device comprises one collection tank in each hull and alternatively a single tank which covers the bow of all the hulls, in the case whereof the frontal deflector is done without.

* * * * *